(12) United States Patent
Cacioppo et al.

(10) Patent No.: US 9,036,792 B2
(45) Date of Patent: May 19, 2015

(54) METHOD FOR CONFIRMING END POINT LOCATION OF 911 CALLS

(75) Inventors: Christina Cacioppo, Aberdeen, NJ (US); Christopher P. Gilboy, Freehold, NJ (US); Stephen Shinners, Freehold, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 782 days.

(21) Appl. No.: 12/648,703

(22) Filed: Dec. 29, 2009

(65) Prior Publication Data

US 2010/0105353 A1 Apr. 29, 2010

Related U.S. Application Data

(63) Continuation of application No. 12/258,586, filed on Oct. 27, 2008, now Pat. No. 7,664,234, which is a continuation of application No. 11/525,397, filed on Sep. 22, 2006, now Pat. No. 7,450,694, which is a continuation of application No. 10/774,718, filed on Feb. 9, 2004, now Pat. No. 7,133,498.

(60) Provisional application No. 60/463,783, filed on Apr. 18, 2003.

(51) Int. Cl.
| | |
|---|---|
| *H04M 11/04* | (2006.01) |
| *H04M 1/64* | (2006.01) |
| *H04W 4/02* | (2009.01) |
| *H04W 4/18* | (2009.01) |
| *H04W 4/20* | (2009.01) |
| *H04L 29/08* | (2006.01) |

(52) U.S. Cl.
CPC ........ *H04W 4/02* (2013.01); *H04W 4/18* (2013.01); *H04W 4/20* (2013.01); *H04L 67/04* (2013.01); *H04L 67/18* (2013.01)

(58) Field of Classification Search
USPC .................................. 379/45–48, 88.13
See application file for complete search history.

(56) References Cited

U.S. PATENT DOCUMENTS

| | | | | |
|---|---|---|---|---|
| 5,327,144 | A | * | 7/1994 | Stilp et al. ..................... 342/387 |
| 5,570,412 | A | * | 10/1996 | LeBlanc ..................... 455/456.2 |
| 5,625,668 | A | * | 4/1997 | Loomis et al. ............. 455/456.5 |
| 5,845,227 | A | * | 12/1998 | Peterson ...................... 701/420 |
| 5,867,559 | A | * | 2/1999 | Jorgensen et al. ........... 379/67.1 |
| 5,929,752 | A | * | 7/1999 | Janky et al. ................ 340/426.2 |
| 6,091,957 | A | | 7/2000 | Larkins et al. |
| 6,172,644 | B1 | * | 1/2001 | Stilp ............................. 342/457 |
| 6,363,138 | B1 | | 3/2002 | Aprile |
| 6,456,854 | B1 | | 9/2002 | Chern et al. |
| 6,526,125 | B1 | * | 2/2003 | Lindsay et al. ................. 379/45 |
| 6,553,236 | B1 | * | 4/2003 | Dunko et al. ............. 455/456.1 |
| 6,748,225 | B1 | * | 6/2004 | Kepler ....................... 455/456.2 |
| 6,765,998 | B2 | * | 7/2004 | Bruce et al. ................ 379/88.18 |
| 6,868,074 | B1 | | 3/2005 | Hanson |
| 6,882,313 | B1 | | 4/2005 | Fan et al. |

(Continued)

*Primary Examiner* — Joseph T Phan
(74) *Attorney, Agent, or Firm* — Akerman LLP; Michael K. Dixon; Roy P. Zachariah

(57) ABSTRACT

Certain exemplary embodiments comprise a method comprising receiving, from a user-operated telecommunications device, a user-initiated communication to a non-911 communications address. The method can comprise automatically providing a user with a current location of a user-associated telecommunications device. The method can comprise requesting, from the user, verification of the current location of the user-associated telecommunications device.

19 Claims, 3 Drawing Sheets

(56) References Cited

U.S. PATENT DOCUMENTS

| | | |
|---|---|---|
| 6,963,640 B1 * | 11/2005 | Manning .................. 379/355.08 |
| 7,133,498 B2 * | 11/2006 | Cacioppo et al. ............... 379/45 |
| 7,443,340 B2 * | 10/2008 | Abraham et al. ......... 342/357.43 |
| 7,450,694 B2 | 11/2008 | Cacioppo et al. |
| 7,664,234 B2 * | 2/2010 | Cacioppo et al. ............... 379/45 |
| 7,680,594 B2 * | 3/2010 | Cabral et al. .................. 701/423 |
| 8,055,443 B1 * | 11/2011 | Uyeki et al. ................... 701/414 |
| 8,180,379 B2 * | 5/2012 | Forstall et al. .............. 455/456.6 |
| 2002/0115453 A1 * | 8/2002 | Poulin et al. .................... 455/456 |
| 2003/0069692 A1 * | 4/2003 | Krasner et al. ................. 701/213 |
| 2003/0182054 A1 | 9/2003 | Peterson et al. |
| 2004/0203923 A1 * | 10/2004 | Mullen ....................... 455/456.1 |
| 2005/0153745 A1 | 7/2005 | Smethers |
| 2009/0029717 A1 * | 1/2009 | Bates et al. ................. 455/456.1 |

* cited by examiner

METHOD FOR CONFIRMING END POINT LOCATION OF 911 CALLS

CROSS-REFERENCES TO RELATED APPLICATIONS

This application is a continuation of, claims priority to, and incorporates by reference herein in its entirety, pending U.S. patent application Ser. No. 12/258,586, filed 27 Oct. 2008, which is:

a continuation of Ser. No. 11/525,397, filed 22 Sep. 2006, now U.S. Pat. No. 7,450,694, which claims priority to the following:

U.S. patent application Ser. No. 10/774,718, filed 9 Feb. 2004, now U.S. Pat. No. 7,133,498, and:

U.S. Provisional Patent Application 60/463,783, filed 18 Apr. 2003.

BACKGROUND

U.S. Pat. No. 6,526,125 (Lindsay), which is incorporated by reference herein in its entirety, allegedly cites a "system for electronic correction and notification of discrepancies relating to automatic location identification information in a telephone environment comprising an initiating means for an operator to engage the system; a correction entry means for entering corrected information; and a dissemination means for disseminating the corrected information to recipients. The initiating means is connected with the telephone environment at an operator location having access to stored location identification information. The correction entry means is connected with the initiating means and includes an information entry means. The correction entry means responds to an initiation signal from the initiation means to receive correction information from the information entry means. The correction information is applied to update the stored location information at the operator location. The dissemination means is connected with the correction entry means, receives the correction information and disseminates the correction information to recipients. The method includes the steps of (a) receiving a call from a telephone user; (b) providing stored location identification information pertinent to the user using a computing device as displayed identification information; (c) an operator conferring with the user to verify accuracy of the displayed identification information; (d) if discrepancies are identified in the displayed identification information, the operator engaging a correction entry display with the computing device; (e) the operator entering correcting information in the correction entry display; (f) correcting the discrepancies using the correcting information; and (g) disseminating notice of the correcting to recipients." See Abstract.

U.S. Pat. No. 5,867,559 (Jorgensen), which is incorporated by reference herein in its entirety, allegedly cites in "a call verification system, a telephone switch conference bridge couples the agent/client conversation to a multi-processor sound-and-screen server, which digitally stores the agent-client conversation. When the agent completes inputting data to the client record, at least the updated portion of the client record is also coupled to the sound-and-screen server. The sound-and-screen server includes a data base manager that correlates storage of the client record with the conversation recording. In the verification operation, the sound and screen server operating in a multi-processing mode can fetch a conversation recording and the corresponding transaction record from memory while simultaneously recording new conversations and their associated records." See Abstract.

U.S. Pat. No. 6,363,138 (Aprile), which is incorporated by reference herein in its entirety, allegedly cites an "ALI information management system which includes an ALI information manager communicatingly connected to one or more regional E-911 Service Centers and to one or more PBX's having ALI information stored therein. The ALI information manager is configured to import ALI information from the PBX's, and possibly also from one or more E-911 Service Centers, and form and/or update an ALI database using the ALI information imported. The ALI information manager is configured to send ALI information which is contained in the ALI database to the one or more regional E-911 Service Centers to continuously maintain a current master ALI database at each regional E-911 Service Center." See Abstract.

U.S. Pat. No. 5,570,412 (LeBlanc), which is incorporated by reference herein in its entirety, allegedly cites a "system and method for updating a location databank of a personal location system which is directed for use in a wireless communication system. A plurality of update centers are provided at known fixed locations within a base station coverage area. Each of the update centers is operative to transmit its own pre-calibrated location information to a location databank along with real-time RF measurements for the base station. Each of the base stations is provided in electrical communication with a location adjunct processor which, in turn, is provided in electrical communication with the location databank and the public switched telephone network. Processing logic is operative to obtain the desired RF measurement at GeoPads which are provided in electrical communication with each update center. Processing logic is further operative to initiate a call to the LAP in order to transmit the measurements to the location databank along with the decoded location information so as to provide periodic updating." See Abstract.

SUMMARY

Certain exemplary embodiments comprise a method comprising receiving, from a user-operated telecommunications device, a user-initiated communication to a non-911 communications address. The method can comprise automatically providing a user with a current location of a user-associated telecommunications device. The method can comprise requesting, from the user, verification of the current location of the user-associated telecommunications device.

BRIEF DESCRIPTION OF THE DRAWINGS

A wide variety of potential embodiments will be more readily understood through the following detailed description, with reference to the accompanying drawings in which.

DEFINITIONS

Figure 1:
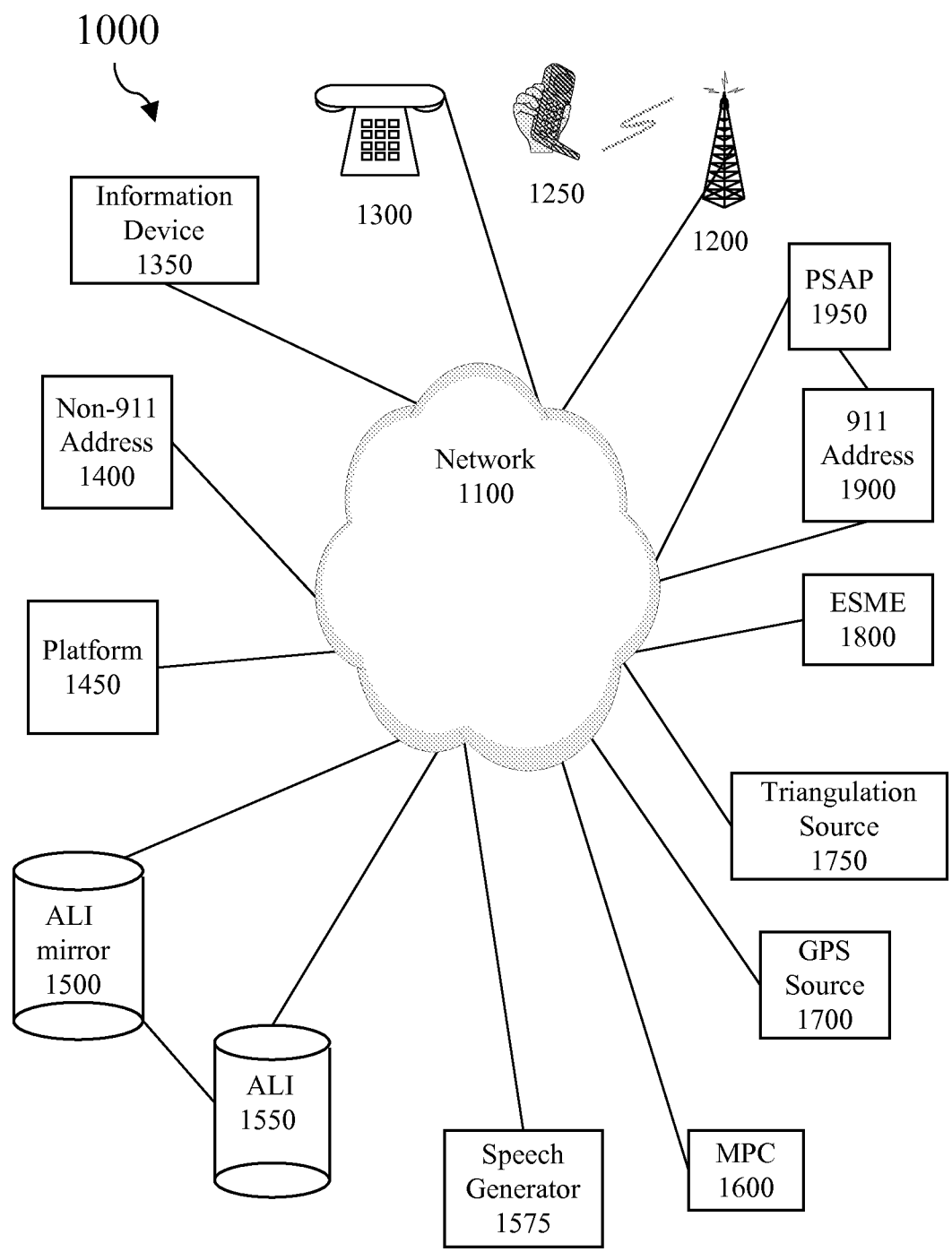
FIG. 1 is a block diagram of an exemplary embodiment of a telecommunications system 1000.

When the following terms are used herein, the accompanying definitions apply:

Automatic Location Information (ALI)—a database that associates a location with a communications address of a telecommunications device.

communication—the exchange of information.

communications address—an identifier used for identifying a telecommunications device or circuit associated with a telecommunications device. For example, a communication address can be a mobile telephone number, a landline telephone number, a URL, and/or an IP address, etc.

current—contemporaneous to the present time.

database—an organized collection of information. A database can comprise a mirror of a primary database. For example, an ALI database can comprise a mirror of a primary ALI database.

Emergency Service Message Entity (ESME)—an information device on a 911 network. An ESME can be adaptable to receive and/or provide information indicative of the location of a wireless telecommunications device.

firmware—machine-readable instructions that are stored in a read-only memory (ROM). ROM's can comprise PROMs and EPROMs.

Global Position System (GPS)—a system adaptable to determine a terrestrial location of a device receiving signals from multiple satellites.

GPS source—a provider of information regarding a location of a wireless telecommunications device determined via GPS.

haptic—both the human sense of kinesthetic movement and the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

information device—any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Handspring Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can include well-known components such as one or more network interfaces, one or more processors, one or more memories containing instructions, and/or one or more input/output (I/O) devices, one or more user interfaces, etc.

Internet—an interconnected global collection of networks that connect information devices.

I/O device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

location—a place substantially approximating where something physically exists.

memory device—any device capable of storing analog or digital information, for example, a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory can be coupled to a processor and can store instructions adapted to be executed by the processor according to an embodiment disclosed herein.

mirror—information that is a replica of primary information.

mobile positioning center (MPC)—a facility, system, and/or device adaptable to provide information indicative of the location of a wireless telecommunications device. The information indicative of the location can include longitude, latitude, and/or elevation, etc.

modify—to change, alter, and/or correct, etc.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

non-911—any communications address other than 911.

processor—a device for processing machine-readable instruction. A processor can be a central processing unit, a local processor, a remote processor, parallel processors, and/or distributed processors, etc. The processor can be a general-purpose microprocessor, such the Pentium III series of microprocessors manufactured by the Intel Corporation of Santa Clara, Calif. In another embodiment, the processor can be an Application Specific Integrated Circuit (ASIC) or a Field Programmable Gate Array (FPGA) that has been designed to implement in its hardware and/or firmware at least a part of an embodiment disclosed herein.

Public Safety Answering Point (PSAP)—a location and/or communications address to which emergency telecommunications, including both 911 and non-911 emergency telecommunications are routed. For example, a call to 911 can be received and/or answered by a PSAP.

radio frequency identification (RFID)—a technology wherein the electromagnetic or electrostatic coupling in the RF portion of the electromagnetic spectrum is used to transmit signals. An RFID system comprises an antenna and a transceiver, which reads information using radio frequencies and transfers the information to a processing device. An RFID can comprise a transponder, or tag, which is an integrated circuit containing the RF circuitry and information to be transmitted.

site—a physical or logical position of something. For example, an Internet site can be a logical position on the World Wide Web associated with a URL and/or IP address.

spoken—audible sounds modulated as speech.

system—A collection of devices and/or instructions, the collection designed to perform one or more specific functions.

telecommunications device—a product adaptable to communicate over a distance. For example, a telephone, fax machine, telex, networked information device, and/or cellular telephone, etc.

telephone call—a communication between two entities using a telephone or other telephonic information device.

telephone number—a series of numerals used for identifying a particular telecommunications circuit and/or device.

text-to-speech conversion—the transformation of textual information into synthetic speech. Textual information can be provided, for example, in an ASCII format. The synthetic speech can be made audible by an information device and/or system.

triangulation source—a provider of wireless device location information, the provider using one or more triangulation techniques. A triangulation technique can use multiple receivers, receiving circuits, and/or receiving processes, each of which focuses on the direction of maximum signal strength of a particular signal, such as a signal generated by a particular GPS satellite.

user—a person interfacing with a telecommunications system.

user-associated—something connected with a user. For example, a user-associated communications device can be a cellular telephone owned by the user.

user-initiated—any activity began by a user.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

user-operated—a function performed by a user.

verification—to establish the accuracy of provided information, such as determining whether a location is correct.

wireless—any means to transmit a signal that does not require the use of a wire or guide connecting a transmitter and a receiver, such as radio waves, electromagnetic signals at any frequency, lasers, microwaves, etc., but excluding purely visual signaling, such as semaphore, smoke signals, sign language, etc.

wireless packet data—information broken into packets for transmission on a wireless network.

wireline—any means to transmit a signal comprising the use of a wire or waveguide (e.g., optical fiber) connecting a transmitter and receiver. Wireline communications can comprise, for example, telephone communications over a POTS network.

DETAILED DESCRIPTION

FIG. 1 is a block diagram of an exemplary embodiment of a system 1000, which can comprise a network 1100. Network 1100 can be communicatively couplable to a plurality of wireless and/or wireline telecommunications devices, circuits, and/or systems. In certain exemplary embodiments, network 1100 can comprise a telecommunications network such as a switched access telephony network and/or a packet network. In certain exemplary embodiments, network 1100 can comprise multiple networks transporting voice and/or data. In certain exemplary embodiments, network 1100 can comprise a 911 tandem and/or the Internet.

Network 1100 can be communicatively couplable to a wireless telecommunications system 1200. Wireless telecommunications system 1200 can comprise hardware and/or software to communicatively couple a wireless telecommunications device 1250 to network 1100. Wireless telecommunications system 1200 can comprise one or a plurality of transmission towers.

Network 1100 can be communicatively couplable to a wireline telecommunications device 1300. Wireline communications device 1300 can be communicatively coupled to network 1100 by a plurality of hardware and software elements comprising wired connections.

Network 1100 can be communicatively couplable to an information device 1350. Information device 1350 can be couplable to the Internet. Coupling information device 1350 to the Internet can provide a user with access to web sites.

Network 1100 can be communicatively coupled to a plurality of elements adaptable for use in emergency management. Elements adaptable for use in emergency management can comprise a 911 telecommunications address 1900. A communication addressed to a 911 telecommunications address 1900 can be routed by a plurality of devices, circuits, and/or systems to a Public Service Access Point (PSAP) 1950. PSAP 1950 can be further couplable to network 1100. An operator at PSAP 1950 can act to dispatch personnel and/or equipment to the site of an emergency.

PSAP 1950 can be communicatively couplable to a platform 1450 via network 1100. Platform 1450 can be adaptable to contact at least one of a plurality of sources to obtain current location information. Platform 1450 can be adaptable to be communicatively couplable to ALI mirror 1500 and/or ALI 1550. ALI mirror 1500 and/or ALI 1550 can be communicatively coupled to network 1100. ALI mirror 1500 and/or ALI 1550 can comprise information indicative of current location, such as the current location of wireline telecommunications device 1300.

Via network 1100, platform 1450 can be adaptable to be communicatively couplable to a Mobile Positioning Center (MPC) 1600, a Global Positioning Satellite (GPS) source 1700, a triangulation source 1750, and/or an Emergency Service Message Entity (ESME) 1800, any of which can provide information indicative of the current location of one or more wireless telecommunications devices, such as wireless telecommunications device 1250. Automatically obtaining the current location of a telecommunications device used to contact 911 telecommunications address 1900 can provide faster and/or more efficient emergency services.

Verifying the validity of current location information can assist with the development and use of emergency management services. In certain exemplary embodiments, a non-911 telecommunications address 1400 can be adaptable for a user to verify the validity of current location information.

In certain exemplary embodiments, non-911 address 1400 can be a telephone number. In certain exemplary embodiments, non-911 address 1400 can be an Internet address usable, for example, by a user-operated device such as information device 1350. Non-911 address 1400 can be adaptable for the user of user-operated telecommunications device to obtain, verify, and/or modify the current location of a user-associated telecommunications device, such as wireless telecommunications device 1250 or wireline telecommunications device 1300.

Non-911 address 1400 can be communicatively couplable to ALI 1550 and/or ALI mirror 1500 via platform 1450 and/or network 1100. Non-911 address 1400 can be communicatively couplable to a plurality of sources of information indicative of the current location of wireless telecommunications device 1250. For example, non-911 address 1400 can be communicatively couplable, via platform 1450 and/or network 1100, to mobile positioning center (MPC) 1600, GPS source 1700, triangulation source 1750, and/or ESME 1800.

Platform 1450 can be communicatively couplable to a speech generator 1575. Speech generator 1575 can be adaptable to provide the user of a user-operated telecommunications device with current location information relating to a user-associated telecommunications device in an audible format without using a human operator. In certain exemplary embodiments, speech generator 1575 can use text-to-speech conversion to provide audible current location information to the user. In certain exemplary embodiments, the user can be provided with textual current location information at, for example, an Internet web site accessible by information device 1350.

Figure 2:
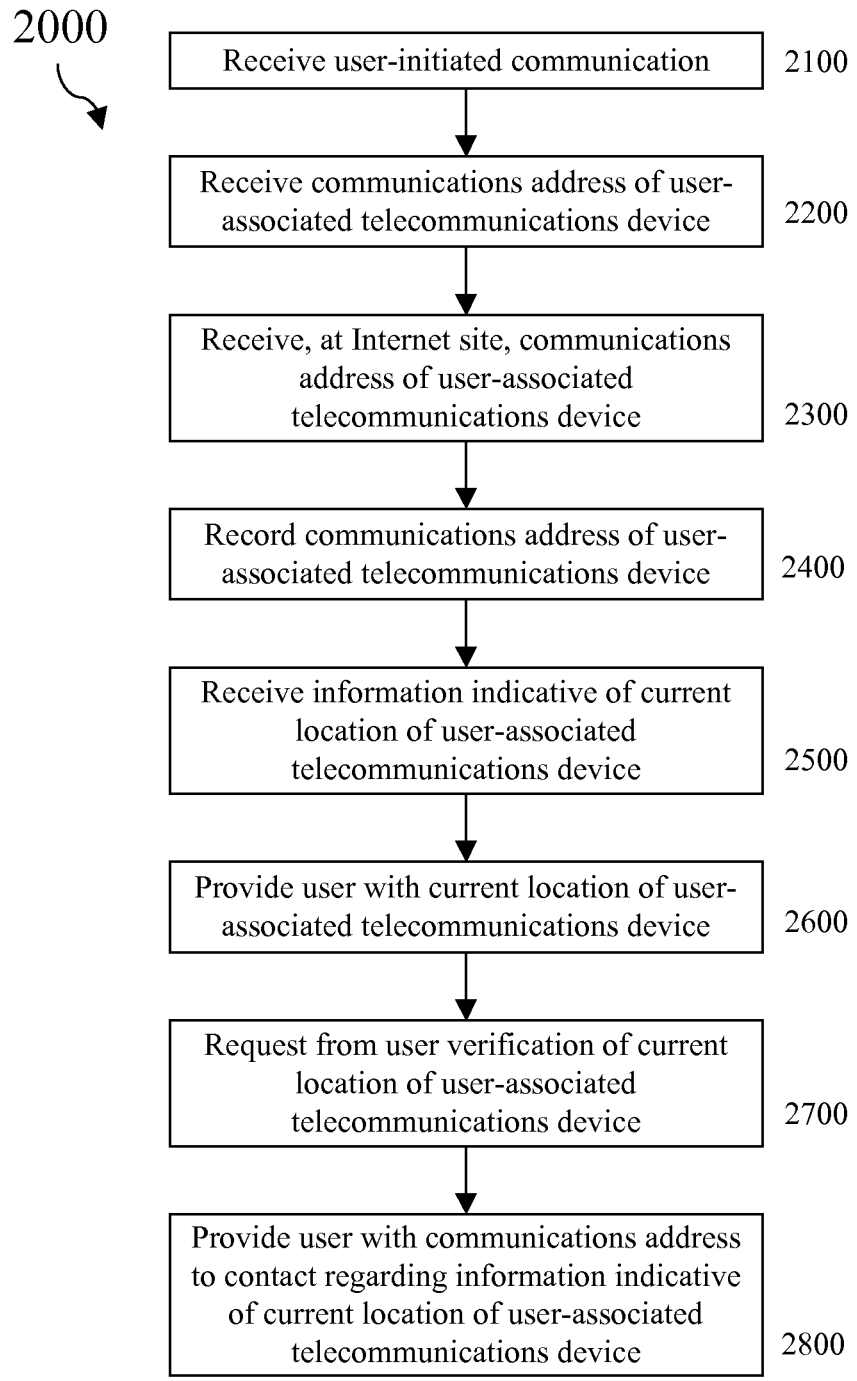
FIG. 2 is a flow diagram of an exemplary embodiment of a method 2000.

FIG. 2 is a flow diagram of an exemplary embodiment of a method 2000, which can be used for verifying a current location of a user-associated telecommunications device. At activity 2100, a user-initiated communication can be received from a user-operated telecommunications device. The user-initiated communication can be received at a platform adaptable to communicatively couple the user-associated telecommunications device to a non-911 telecommunications address. The user-initiated communication can be for the purpose of verifying current location information of a user-associated telecommunications device. In certain exemplary embodiments, the user-operated telecommunications device and the user-associated telecommunications device can be the same device. In certain exemplary embodiments, the user-operated telecommunications device can be a different device than the user-associated telecommunications device. In certain exemplary embodiments, the user-initiated communication can be a telephone call. In certain exemplary embodiments, the user-initiated communication can be an Internet-assisted database query. In certain exemplary embodiments, the user-initiated communication can be received at a non-911 telecommunications address.

In certain exemplary embodiments, the user can initiate the communication via a user-operated telecommunications device, the device associated with a communications address locatable by the system. In certain exemplary embodiments, the user can initiate the communication via the user-operated telecommunications device that is not the user-associated telecommunications device for which current location information is sought. Thus, the current location of the user-operated telecommunications device (e.g., a personal computer, PDA, etc.) is not necessarily obtained, determined, and/or provided by the system. Instead, the system can obtain, determine, and/or provide the current location of the user-associated telecommunications device (e.g., a cellular telephone, wireline phone, etc.).

At activity 2200, the user can receive the communications address of the user-associated telecommunications device. In certain exemplary embodiments, the communications address of the user-associated telecommunications device can be received automatically pursuant to the user initiated communication, such as from platform 1450 of FIG. 1. In certain exemplary embodiments, the user can manually receive the communications address of the user-associated telecommunications device from an operator.

At activity 2300, the communications address of user-associated telecommunications device can be received at an Internet site. The Internet site can be adaptable to provide current location information responsive to a user input of a communications address of a user-associated telecommunications device.

At activity 2400, the communications address of the user-associated telecommunications device can be recorded. Recording the communications address of the user-associated telecommunications device can assist an entity reviewing and/or auditing current location information verifications with documentation that the telecommunications address and current location of a telecommunications device has been tested, modified, and/or verified.

At activity 2500, information indicative of a current location of the user-associated telecommunications device can be received, for example, by platform 1450 of FIG. 1. The current location of the user-associated telecommunications device can be received from an ALI, an ALI mirror database, a MPC, a GPS source, a triangulation source, and/or an ESME, etc. In certain exemplary embodiments, the current location of the user-associated telecommunications device can be received from a radio frequency identification (RFID) system. The RFID system can determine information indicative of the current location of the user-associated telecommunications device that comprises, for example, an RFID tag, using a technique such as triangulation.

At activity 2600, the user can be provided with current location of the user-associated telecommunications device. The user can be provided with the current location of the user-associated telecommunications device via an operator's speech, via synthetic speech obtainable from a speech generator, via text at an interactive Internet web site, via a text message on a cellular telephone, via a graphical representation such as a map, via a wireline telecommunications device, via a wireless telecommunications device and/or via wireless packet data, etc. Synthetic speech can be generated via text-to-speech conversion.

At activity 2700, verification of current location of user-associated telecommunications device can be requested from user. The user can provide verification of current location of user-associated telecommunications device, for example, via pressing a key on a touch tone telecommunications device, via a user input at an Internet web site, and/or via contacting a separate communications address, etc.

At activity 2800, the user can be provided with a communications address to contact to challenge, modify, and/or verify system-provided information regarding the current location of the user-associated telecommunications device. Upon receiving input from the user regarding the actual current location of the user-associated telecommunications device and/or the accuracy of the system-provided information, the system can record the user's feedback and/or update its information to reflect the user-provided current location information.

Figure 3:
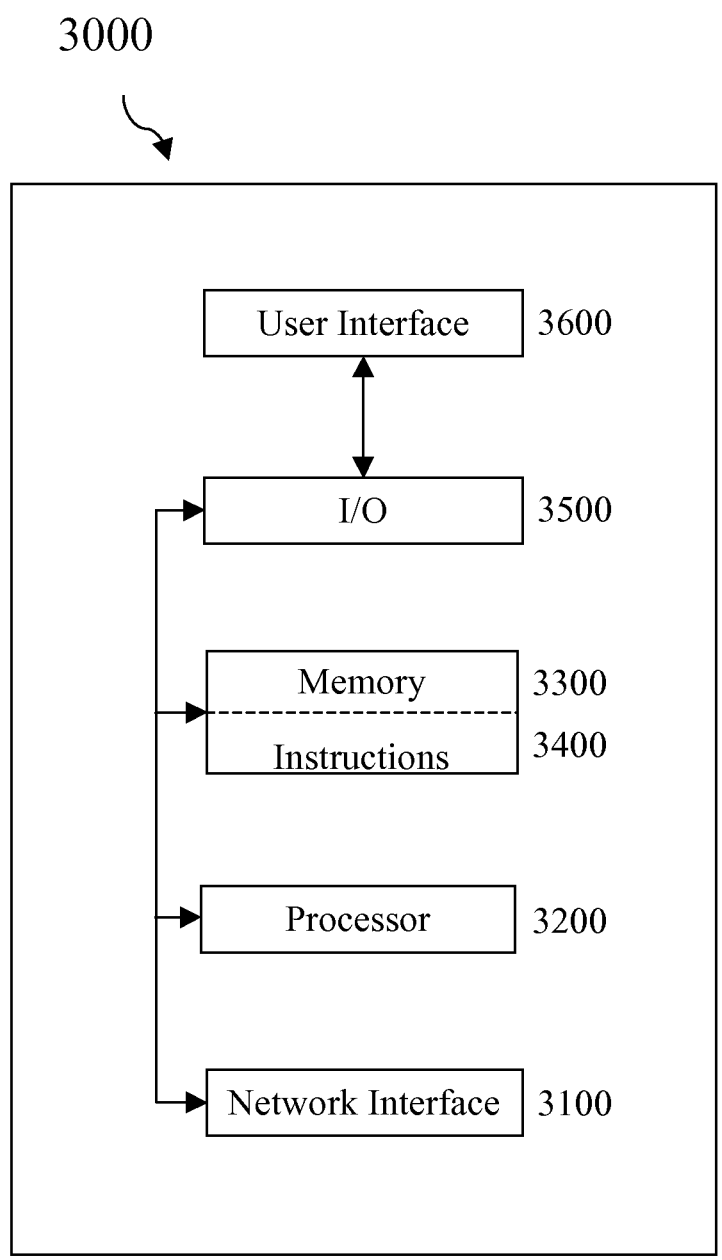
FIG. 3 is a block diagram of an exemplary embodiment of an information device 3000.

FIG. 3 is a block diagram of an exemplary embodiment of an information device 3000, which in certain operative embodiments can represent, for example, information device 1350, platform 1450, and/or speech generator 1575 of FIG. 1. Information device 3000 can comprise any of numerous well-known components, such as for example, one or more network interfaces 3100, one or more processors 3200, one or more memories 3300 containing instructions 3400, one or more input/output (I/O) devices 3500, and/or one or more user interfaces 3600 coupled to I/O device 3500, etc.

In certain exemplary embodiments, via one or more user interfaces 3600, such as a graphical user interface, a user can provide a telecommunications address of a user-associated telecommunications device of interest and/or can receive current location information concerning the user-associated telecommunications device of interest.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, field, background, summary, abstract, drawing figure, etc.) of this application, unless clearly specified to the contrary, there is no requirement for the inclusion in any claim of the application of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render a claim invalid, then any such conflicting information in such incorporated by reference material is specifically not incorporated by reference herein.

What is claimed is:

1. A method comprising:
    requesting, from a user, a verification of a current location of a user-associated telecommunications device in response to a user-initiated communication from a user-operated telecommunications device, wherein the user-operated telecommunications device is distinct from the user-associated telecommunications device, wherein the verification of the current location is performed by utilizing instructions from memory that are executed by a processor;
    recording a communications address of the user-associated telecommunications device, wherein recording of the communications address is utilized to determine if the current location has been modified;
    determining if the current location of the user-associated telecommunications device has been modified based on the communications address that has been recorded;
    providing a different communications address to the user so as to obtain feedback from the user, wherein the feedback from the user is for verifying the current location of the user-associated telecommunications device;
    updating the current location of the user-associated telecommunications device to a new location if the feedback sent to the different communications address confirms that the current location is not verified; and providing the user with a location of the user-associated telecommunications device via a rendered graphical representation of the current location of the user-associated telecommunications device.

2. The method of claim 1, further comprising providing the user with a spoken current location of the user-associated telecommunications device.

3. The method of claim 1, further comprising modifying the current location of the user-associated telecommunications device in response to information from the user.

4. The method of claim 1, further comprising receiving the communications address of the user-associated telecommunications device from the user.

5. The method of claim 1, further comprising receiving at an internet site the communications address of the user-associated telecommunications device.

6. The method of claim 1, further comprising obtaining information indicative of the current location of the user-associated telecommunications device from an automatic location information database.

7. The method of claim 1, further comprising obtaining information indicative of the current location of the user-associated telecommunications device from a mobile positioning center.

8. The method of claim 1, further comprising obtaining information indicative of the current location of the user-associated telecommunications device from a triangulation source.

9. The method of claim 1, further comprising obtaining information indicative of the current location of the user-associated telecommunications device from a global positioning system source.

10. The method of claim 1, further comprising obtaining information indicative of the current location of the user-associated telecommunications device from an emergency service message entity.

11. The method of claim 1, further comprising providing to the user-operated telecommunications device information indicative of the current location of the user-associated telecommunications device via wireless packet data.

12. The method of claim 1, further comprising providing the user with a location of the user-associated telecommunications device in an audible format without using a human operator.

13. The method of claim 1, further comprising providing the user with a location of the user-associated telecommunications device via a text message.

14. The method of claim 1, further comprising providing the user with a location of the user-associated telecommunications device via an internet web site.

15. The method of claim 1, wherein the user-associated telecommunications device is a wireless telecommunications device.

16. The method of claim 1, wherein the communications address of the user-operated telecommunications device is a non-911 communications address.

17. The method of claim 1, wherein the user-initiated communication is an internet-assisted database query.

18. A system comprising:
a verification processor that executes instructions to performs operations comprising:
requesting, from a user, a verification of a current location of a user-associated telecommunications device in response to a user-initiated communication received from a non-911 communications address received from a user-operated telecommunications device, wherein the user-operated telecommunications device is distinct from the user-associated telecommunications device;
recording a communications address of the user-associated telecommunications device, wherein recording of the communications address is utilized to determine if the current location has been modified;
determining if the current location of the user-associated telecommunications device has been modified based on the communications address that has been recorded;
providing a different communications address to the user so as to obtain feedback from the user, wherein the feedback from the user is for verifying the current location of the user-associated telecommunications device;
updating the current location of the user-associated telecommunications device to a new location if the feedback sent to the different communications address confirms that the current location is not verified; and
providing the user with a location of the user-associated telecommunications device via a rendered graphical representation of the current location of the user-associated telecommunications device.

19. A machine-readable device storing machine-executable instructions, which when loaded and executed by a processor, cause the processor to perform operations comprising:
requesting from a user a verification of a current location of a user-associated telecommunications device in response to a user-initiated communication from a user-operated telecommunications device, wherein the user-operated telecommunications device is distinct from the user-associated telecommunications device;
recording a communications address of the user-associated telecommunications device, wherein recording of the communications address is utilized to determine if the current location has been modified;
determining if the current location of the user-associated telecommunications device has been modified based on the communications address that has been recorded;
providing a different communications address to the user so as to obtain feedback from the user, wherein the feedback from the user is for verifying the current location of the user-associated telecommunications device;
updating the current location of the user-associated telecommunications device to a new location if the feedback sent to the different communications address confirms that the current location is not verified; and providing the user with a location of the user-associated telecommunications device via a rendered graphical representation of the current location of the user-associated telecommunications device.

* * * * *